US009348729B2

(12) United States Patent
Gripon

(10) Patent No.: US 9,348,729 B2
(45) Date of Patent: May 24, 2016

(54) SECURED MANAGEMENT OF TRACES IN A MAIL PROCESSING DEVICE

(71) Applicant: NEOPOST TECHNOLOGIES, Bagneux (FR)

(72) Inventor: Sebastien Gripon, Rungis (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 253 days.

(21) Appl. No.: 14/108,829

(22) Filed: Dec. 17, 2013

(65) Prior Publication Data
US 2014/0173103 A1    Jun. 19, 2014

(30) Foreign Application Priority Data

Dec. 18, 2012 (EP) .................................... 12306609

(51) Int. Cl.
| | |
|---|---|
| G06F 11/00 | (2006.01) |
| G06F 11/36 | (2006.01) |
| H04L 12/26 | (2006.01) |
| G06F 11/34 | (2006.01) |

(52) U.S. Cl.
CPC ........ *G06F 11/3636* (2013.01); *G06F 11/3466* (2013.01); *H04L 43/0876* (2013.01)

(58) Field of Classification Search
CPC   G06F 11/3636; G06F 11/3466; G06F 11/348
See application file for complete search history.

(56) References Cited

U.S. PATENT DOCUMENTS

| | | | | |
|---|---|---|---|---|
| 4,845,632 A | * | 7/1989 | Kroll ....................... | G06F 11/14 705/405 |
| 4,908,502 A | * | 3/1990 | Jackson ................ | G06F 11/073 235/380 |
| 5,896,535 A | * | 4/1999 | Ronstrom ........... | G06F 11/3636 702/119 |
| 6,038,690 A | * | 3/2000 | Jacobson ........... | G05B 19/4184 700/79 |
| 6,145,100 A | * | 11/2000 | Madduri ............. | G06F 11/3632 713/400 |
| 6,732,307 B1 | | 5/2004 | Edwards | |
| 2007/0130119 A1 | * | 6/2007 | Phillips ............... | G06F 11/3636 |
| 2007/0130320 A1 | | 6/2007 | Morgan et al. | |
| 2008/0161966 A1 | | 7/2008 | Sharma et al. | |

FOREIGN PATENT DOCUMENTS

| | | |
|---|---|---|
| EP | 1 168 181 A2 | 1/2002 |
| GB | 2 261 748 A | 5/1993 |

OTHER PUBLICATIONS

European Search Report for EP 12306609.4, dated May 17, 2013.

* cited by examiner

*Primary Examiner* — Joshua P Lottich
(74) *Attorney, Agent, or Firm* — Seed IP Law Group PLLC

(57) ABSTRACT

Method for activation and storing traces generated by a mail processing device, comprising the following steps:
  connection of a storage apparatus on the mail processing device,
  activation of a traces generation module in the mail processing,
  temporary storage of selected traces in a circular buffer of the mail processing device,
  continuous transfer of the selected traces from the circular buffer to the storage apparatus, and
  when the traces generation is completed, deactivation of the traces generation module in the mail processing device.

11 Claims, 1 Drawing Sheet

SECURED MANAGEMENT OF TRACES IN A MAIL PROCESSING DEVICE

CROSS-REFERENCE TO RELATED APPLICATION

This application relates to and claims the benefit of priority from European Patent Application number 12306609.4, filed on Dec. 18, 2012 the entire disclosure of which is incorporated herein by reference.

TECHNICAL FIELD

The present invention relates to the field of trace recording systems.

PRIOR ART

Tracing can be implemented in a program to record information about the program's execution. This information is typically used by programmers for debugging purposes during the development cycle. It may also help diagnosing problems in the field.

Because software tracing is low-level, the possible volume of trace messages can be huge. However, in a mail processing device such as a Mailing System or an Inserter, the storage capacity for traces is limited and in practice the traces generation is de-activated (either at compile-time or run-time) due to its impact on the performances of the device and the impossibility to stock all the traces in the device. Furthermore, real time operation of the device excludes the possibility to write in non-volatile memory (flash) which is too much time-consuming, and imposes the temporary storage in volatile memory (RAM).

Currently, uploading traces to a remote data server raises some problems because that requires a permanent connection, which is difficult and in some cases impossible to support. Not all customers provide access to internet and a permanent connection would require very significant investments.

Conversely, traces transfer could be possible onto the customer local network. However, this is not doable in practice because a local network is not always available and the transfer of traces onto the customer network could be significantly disrupting (load peaks) and data security is at risk.

SUMMARY OF THE INVENTION

The present invention thus aims to eliminate the above disadvantages and to propose a method for accessing to traces generated by a mail processing device with embedded software, such as a mailing system or an inserter, for the diagnostics of defaults of this device in the field. Another object of the invention is to provide a secured capture activation and management of these traces.

According to a main feature of the invention the method for activation and storing traces generated by a mail processing device, comprises the following steps:
  connection of a storage apparatus on the mail processing device,
  activation of a traces generation module in said mail processing device,
  temporary storage of selected traces in a circular buffer of said mail processing device,
  continuous transfer of the selected traces from said circular buffer to said storage apparatus, and
  when the traces generation is completed, deactivation of the traces generation module in said mail processing device.

With the invention, when an operation default is identified on the mail processing device, the traces generation module can be activated on the device and once the selected traces are collected, the traces generation module is deactivated on the mail processing device.

According to an embodiment, said activation is based on information present in a traces key inserted in said mail processing device and said deactivation is made by removing of said traces key from said mail processing device.

According to another embodiment, said activation and said deactivation are both initiated by reading a barcode or said activation and said deactivation are both initiated by a menu at said storage apparatus.

According to another feature, said traces generation module generates traces related to specific functionalities only in order to minimize the stored volume of traces.

Preferably, said specific functionalities are defined by rules provide by said traces key.

According to still another feature, the continuous transfer of the selected traces between the circular buffer and the storage apparatus is carried out with a low priority.

Advantageously, said continuous transfer is encoded or encrypted to ensure the confidentiality of the traces transferred and avoid any sniffing. The traces transferred in the storage apparatus remain encoded or encrypted after their transfer to prevent any unwanted reading.

According to another feature, said storage device is authenticated by the mail processing device before establishing said continuous transfer of the traces.

The invention also relates to a system for activation and storing traces generated by a mail processing device, comprising:
  a storage apparatus for connection to the mail processing device,
  a traces key for insertion in said mail processing device,
  a traces generation module located in said mail processing device and activated by the information present in said traces key,
  a circular buffer located in said mail processing device for temporary storage of selected traces.

Preferably, said circular buffer has a fixed size.

BRIEF DESCRIPTION OF THE DRAWINGS

The invention will now be further explained and illustrated in the following description with reference to embodiments of the invention as shown in the accompanying drawings, in which.

DETAILED DESCRIPTION

Figure 1:
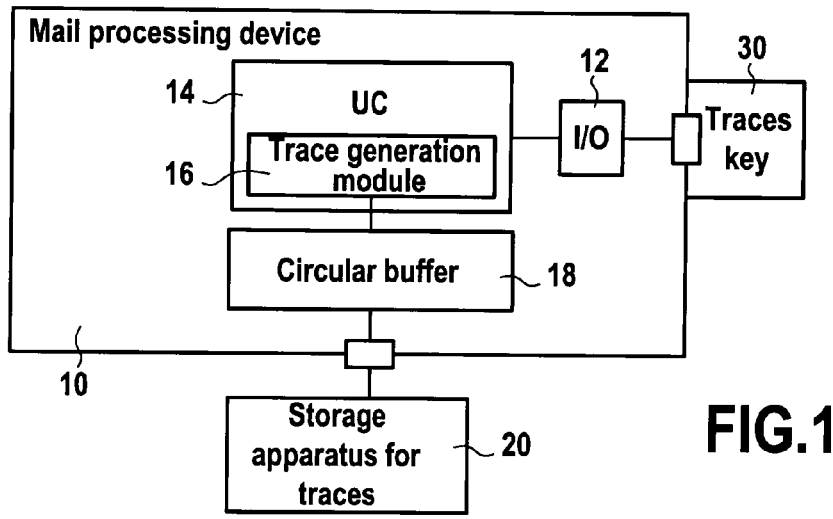
FIG. 1 illustrates a system for storing traces according to invention.

The mail processing device 10 installed in the field with the system of the invention for activation and storing traces generated by this device is illustrated on FIG. 1.

This system for activation and storing traces comprises:
  a storage apparatus 20 for storing the traces which must beforehand be connected to the mail processing device 10 in order to ensure the continuous transfer of traces from this device to the storage apparatus during the device operation, the storage apparatus shall allow for a sufficiently rapid traces transfer from the device to the storage apparatus, a traces key 30, for example a special USB key, provided to a maintenance technician to initiate the activation and which must beforehand be connected to the mail processing device 10 via a I/O port 12 of its central processor unit 14. Indeed, this activation is secured so that only dedicated maintenance personnel can initiate the activation, a traces generation module 16 located in said mail processing device and activated by the information present in the traces key 30. Traces can be limited to specific device functionalities, which are to be diagnosed, so as to minimize the volume of traces to be generated. The traces selectivity is defined by rules provided by the traces key, and a circular buffer 18 for a temporary traces storage in the mail processing device while waiting for transfer to the storage apparatus 20. The buffer has preferably a fixed size. It is a circular buffer, and when it is full, the oldest traces are overwritten. In practice, the buffer sizing and traces transfer management prevent from this occurrence.

The activation initiates the traces generation by the Device and the continuous traces transfer from the mail processing device 10 to the storage apparatus 20. This transfer is carried out in the background with a low priority so as to not disturb the operation and performances of the mail processing device.

The traces transfer from the mail processing device 10 to the storage apparatus 20 is secured. Preferably, the storage apparatus is authenticated by the mail processing device before establishing the traces transfer, in particular: at each device power-on, each time the mail processing device detects a new storage apparatus (case of disconnection). Furthermore, traces are made confidential to counter any sniffing of the traces transfer. This confidentiality can be ensured via encryption of the traces by the mail processing device before transfer to the storage apparatus or only by encoding of the traces by the mail processing device before transfer to the storage apparatus with lighter rules than an encryption to diminish the encryption load on the mail processing device. The traces encrypted by the mail processing device remain encrypted in the storage apparatus. However, if the traces are not encrypted by the mail processing device, they are encrypted by the storage apparatus. The traces are securely stored in the storage apparatus.

The traces generation in the mail processing device can be deactivated by dedicated maintenance personnel. This deactivation can be performed manually via a technician menu, whose access is controlled by a login or automatically when the traces key is removed by the technician.

Figure 2:
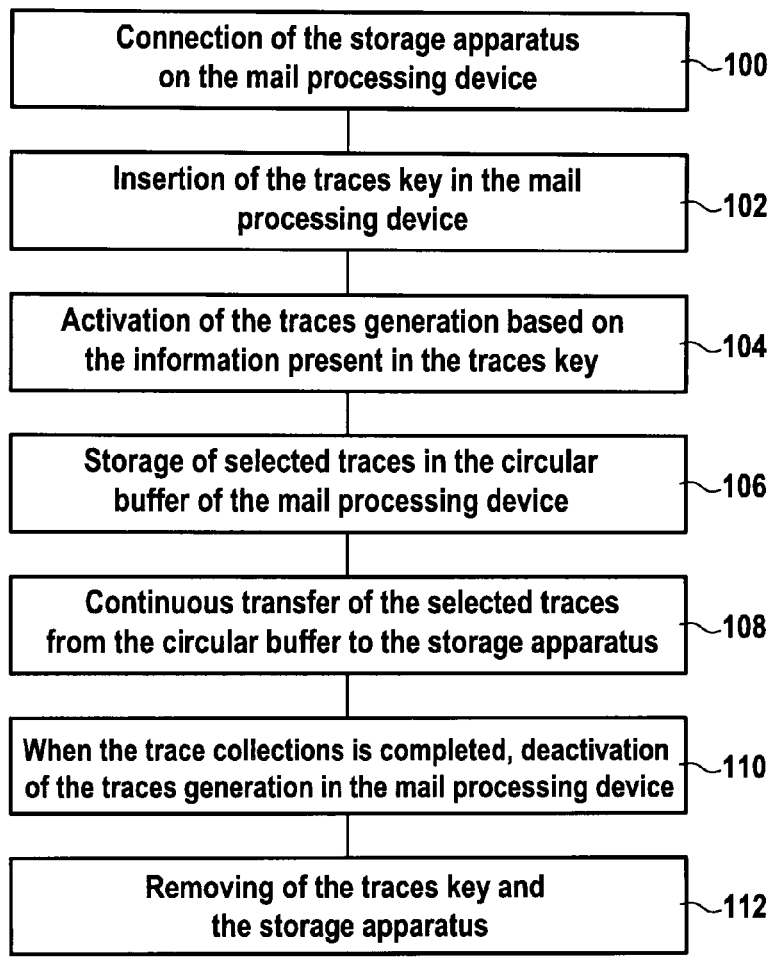
FIG. 2 shows a diagram illustrating the different steps of the method of storing traces of the invention.

FIG. 2 shows an operation mode for traces activation and storage according to the method of the invention. This mode operates when a default is identified on a mail processing device in the field and comprises the following steps:

connection of a storage apparatus on the mail processing device (step 100), this connection being made after power-off of the mail processing device or not if the storage apparatus is of "plug and play" type, insertion of a traces key in said mail processing device (step 102), this connection being made after power-off of the mail processing device or not if the traces key is of "plug and play" type, activation of a traces generation module in said mail processing device based on the information present in said traces key (step 104), temporary storage of selected traces in a circular buffer of said mail processing device (step 106), continuous transfer of the selected traces from said circular buffer to said storage apparatus (step 108), when the traces generation is completed, deactivation of the traces generation module in said mail processing device (step 110), and removing of both said traces key and said storage apparatus (step 112).

Previously, the traces key is prepared including information to activate the traces generation and limit the traces to selected device functionalities, which are to be diagnosed (selective activation).

It must be noted that the traces generation can be deactivated automatically by the removing of the storage apparatus and the traces key or after at the power-off of the mail processing apparatus.

It also can be noted that if the previous operation mode has been illustrated with a traces key, alternative operation modes for traces activation are also possible. For example, it is possible to use a barcode reading. In this mode, rather than automatically activating the traces during the device power-on, the activation is initiated manually by the reading of a specific barcode (either with a handheld 1D barcode reader or with an online scanner). In this mode, the device power-off is not required and the traces are deactivated by reading the same barcode.

It must be noted that if the mail processing device is controlled by a tablet computer (such as an iPad®), the portable computer can serve as the storage apparatus. No new specific connection or disconnection of the portable computer is thus required and traces activation and deactivation are possible by menu via a login in a technician menu of the portable computer, which is classically protected by a PIN code, without using a specific traces key.

The invention claimed is:

1. Method for activation and storing traces generated by a mail processing device, comprising:

connection of a storage apparatus on the mail processing device, activation of a traces generation module in said mail processing device, said activation based on information present in a traces key inserted in said mail processing device, temporary storage of selected traces in a circular buffer of said mail processing device, continuous transfer of the selected traces from said circular buffer to said storage apparatus, when the traces generation is completed, deactivation of the traces generation module in said mail processing device, said deactivation made by removing of said traces key from said mail processing device.

2. Method of claim 1, characterized in that said activation and said deactivation are both initiated by reading a barcode.

3. Method of claim 1, characterized in that said activation and said deactivation are both initiated by a menu at said storage apparatus.

4. Method of claim 1, characterized in that said traces generation module generates traces related to specific functionalities only in order to minimize the stored volume of traces.

5. Method of claim 4, characterized in that said specific functionalities are defined by rules provide by said traces key.

6. Method of claim 1, characterized in that the continuous transfer of the selected traces between the circular buffer and the storage apparatus is carried out with a low priority.

7. Method of claim 6, characterized in that said continuous transfer is encoded or encrypted to ensure the confidentially of the traces transferred and avoid any sniffing.

8. Method of claim 7, characterized in that said storage device is authenticated by the mail processing device before establishing said continuous transfer of the traces.

9. Method of claim 6, characterized in that the traces transferred in the storage apparatus remain encoded or encrypted after their transfer to prevent any unwanted reading.

10. System for activation and storing traces generated by a mail processing device, comprising:
- a traces key for insertion in said mail processing device and for removal from said mail processing device,
- a traces generation module located in said mail processing device and activated by the information present in said traces key,
- a circular buffer located in said mail processing device for temporary storage of selected traces, and
- a storage apparatus for connection to the mail processing device to receive continuous transfer of the selected traces from said circular buffer.

11. System according to claim 10, characterized in that said circular buffer has a fixed size.

* * * * *